(12) United States Patent
Oh

(10) Patent No.: US 10,131,292 B2
(45) Date of Patent: Nov. 20, 2018

(54) CAMERA INCLUDING TRIPLE LENSES

(71) Applicant: LG Electronics Inc., Seoul (KR)

(72) Inventor: Jaeheon Oh, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 492 days.

(21) Appl. No.: 14/830,438

(22) Filed: Aug. 19, 2015

(65) Prior Publication Data

US 2016/0227079 A1 Aug. 4, 2016

(30) Foreign Application Priority Data

Feb. 4, 2015 (KR) .................... 10-2015-0017639

(51) Int. Cl.
| | | |
|---|---|---|
| *B60R 11/04* | (2006.01) | |
| *H04N 13/293* | (2018.01) | |
| *H04N 5/225* | (2006.01) | |
| *H04N 5/372* | (2011.01) | |
| *B60R 11/00* | (2006.01) | |

(52) U.S. Cl.
CPC .......... *B60R 11/04* (2013.01); *H04N 5/2252* (2013.01); *H04N 5/2258* (2013.01); *H04N 5/372* (2013.01); *H04N 13/293* (2018.05); *B60R 2011/0026* (2013.01)

(58) Field of Classification Search
CPC combination set(s) only.
See application file for complete search history.

(56) References Cited

U.S. PATENT DOCUMENTS

| | | | |
|---|---|---|---|
| 9,729,858 B2* | 8/2017 | Livyatan | ............ H04N 13/0246 |
| 2010/0118145 A1* | 5/2010 | Betham | .................. B60R 11/04 |
| | | | 348/148 |
| 2013/0258044 A1 | 10/2013 | Betts-Lacroix | |

(Continued)

FOREIGN PATENT DOCUMENTS

| | | |
|---|---|---|
| CN | 103581651 A | 2/2014 |
| DE | 102012210818 A1 | 1/2014 |

(Continued)

OTHER PUBLICATIONS

Anguelov et al., "Google Street View: Capturing The World At Street Level," USC Viterbi School of Engineering, Dec. 1, 2010, retrieved from http://www-scf.usc.edu/~csci572/2013Spring/pres_1/34_Khemani_GoogleStreetView.ppt, 14 pages.

*Primary Examiner* — Dave Czekaj
*Assistant Examiner* — Tyler W. Sullivan
(74) *Attorney, Agent, or Firm* — Birch, Stewart, Kolasch & Birch, LLP

(57) ABSTRACT

A triple camera uses three image capture modules to provide mono-type image and/or stereo-type image to a vehicle. In one implementation, the triple camera may include a housing defining an external appearance of the triple camera; a first image capture module including a first lens module and a first image sensor to capture a first forward image of a vehicle; a second image capture module including a second lens module and a second image sensor to capture a second forward image of a vehicle; and a third image capture module including a third lens module and a third image sensor to capture a third forward image of a vehicle. The first to third image capture modules may be disposed in the housing.

18 Claims, 16 Drawing Sheets

(56) References Cited

U.S. PATENT DOCUMENTS

| | | |
|---|---|---|
| 2014/0036064 A1 | 2/2014 | Lu et al. |
| 2014/0111682 A1 | 4/2014 | Flügge et al. |
| 2015/0019098 A1* | 1/2015 | Schrabler ............. G01S 17/936 |
| | | 701/70 |
| 2015/0151725 A1* | 6/2015 | Clarke ................. B60W 30/00 |
| | | 701/28 |
| 2015/0207967 A1 | 7/2015 | Fritz et al. |
| 2015/0264230 A1* | 9/2015 | Takeda ................ H04N 5/2252 |
| | | 348/95 |
| 2015/0332104 A1* | 11/2015 | Kapach ................ G06K 9/6215 |
| | | 382/104 |
| 2017/0098131 A1* | 4/2017 | Shashua ............. G06K 9/00805 |
| 2017/0240120 A1* | 8/2017 | Krug ..................... B60R 11/04 |

FOREIGN PATENT DOCUMENTS

| | | |
|---|---|---|
| JP | 2001-88611 A | 4/2001 |
| JP | 3127646 U | 12/2006 |
| JP | 2012-239157 A | 12/2012 |
| JP | 2013-112314 A | 6/2013 |
| KR | 10-2009-0022911 A | 3/2009 |
| KR | 10-2012-0008349 A | 1/2012 |
| KR | 10-2012-0021086 A | 3/2012 |
| KR | 10-2014-0048530 A | 4/2014 |
| KR | 10-2014-0119189 A | 10/2014 |

* cited by examiner

CAMERA INCLUDING TRIPLE LENSES

CROSS-REFERENCE TO RELATED APPLICATION

This application claims the priority benefit of Korean Patent Application No. 10-2015-0017639, filed on Feb. 4, 2015 in the Korean Intellectual Property Office, the disclosure of which is incorporated herein by reference.

BACKGROUND OF THE INVENTION

1. Field of the invention

The present invention relates to a triple camera, and more particularly, to a triple camera installed in a vehicle.

2. Description of the Related Art

Recently, with increasing interest in autonomous vehicles, research on sensors mounted in such autonomous vehicles is being actively made. As examples of the sensors mounted in autonomous vehicles, there are cameras, infrared sensors, radars, GPS devices, lidars, gyroscopes and the like. Among these, the camera is a sensor functioning as an eye and thus is a critical component.

Meanwhile, a stereo camera, which is one type of camera mounted in a vehicle, may be utilized to detect a distance to an obstacle using a disparity map. Such a stereo camera includes a plurality of components as well as two cameras, and thus requires a space for accommodating the components. Furthermore, owing to heat generated from the plurality of components, there may be problems in image processing in the stereo camera. Accordingly, research and development on a space for accommodating components of the camera and research and development on a heat dissipation technology are desperately needed.

A camera installed in a vehicle may include a plurality of cameras having various respective functions. For example, a camera for capturing forward images of a vehicle may include a plurality of cameras corresponding to required types of images. In this case, research and development on efficient utilization of space resulting from efficient construction of the plurality of cameras and research and development on heat dissipation are desperately needed.

SUMMARY OF THE INVENTION

Therefore, the present invention has been made in view of the above problems, and it is an object of the present invention to provide a triple camera including first to third image capture modules, which is provided in a vehicle.

In accordance with an aspect of the present invention, the above and other objects can be accomplished by the provision of a triple camera including a housing defining an external appearance of the triple camera, a first image capture module including a first lens module and a first image sensor to capture a first forward image of a vehicle, a second image capture module including a second lens module and a second image sensor to capture a second forward image of a vehicle, and a third image capture module including a third lens module and a third image sensor to capture a third forward image of a vehicle, wherein the first and second image capture modules are disposed in the housing.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Description will now be given in detail according to exemplary embodiments disclosed herein, with reference to the accompanying drawings. For the sake of brief description with reference to the drawings, the same or equivalent components may be denoted by the same reference numbers, and description thereof will not be repeated. In general, suffixes such as "module" and "unit" may be used to refer to elements or components. Use of such suffixes herein is merely intended to facilitate description of the specification, and the suffixes do not have any special meaning or function. In the present disclosure, that which is well known to one of ordinary skill in the relevant art has generally been omitted for the sake of brevity. The accompanying drawings are used to assist in easy understanding of various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are only used to distinguish one element from another.

It will be understood that when an element is referred to as being "connected with" another element, there may be intervening elements present. In contrast, it will be understood that when an element is referred to as being "directly connected with" another element, there are no intervening elements present.

A singular representation may include a plural representation unless context clearly indicates otherwise.

Terms such as "includes" or "has" used herein should be considered as indicating the presence of several components, functions or steps, disclosed in the specification, and it is also understood that more or fewer components, functions, or steps may likewise be utilized.

Figure 1:
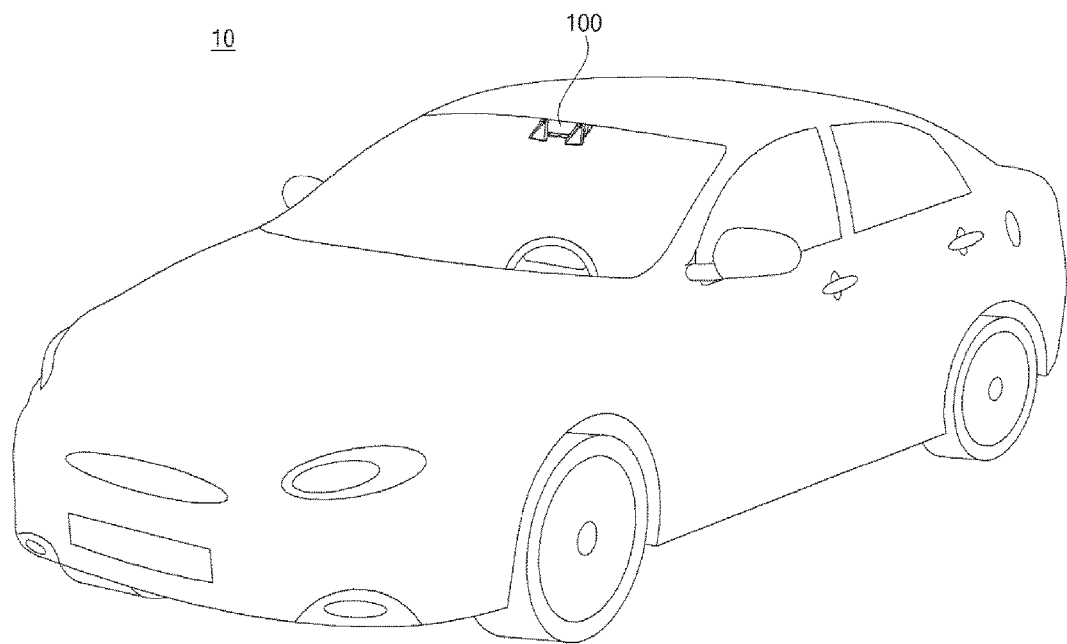
FIG. 1 is a schematic view illustrating a triple camera according to an embodiment of the present invention.
Figure 2:
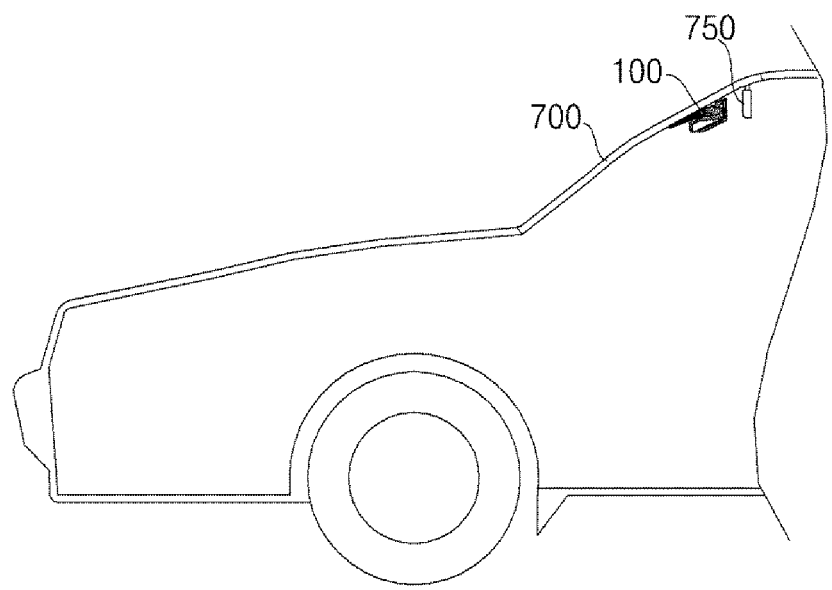
FIG. 2 is a side view illustrating the triple camera according to the embodiment of the present invention.
Figure 3:
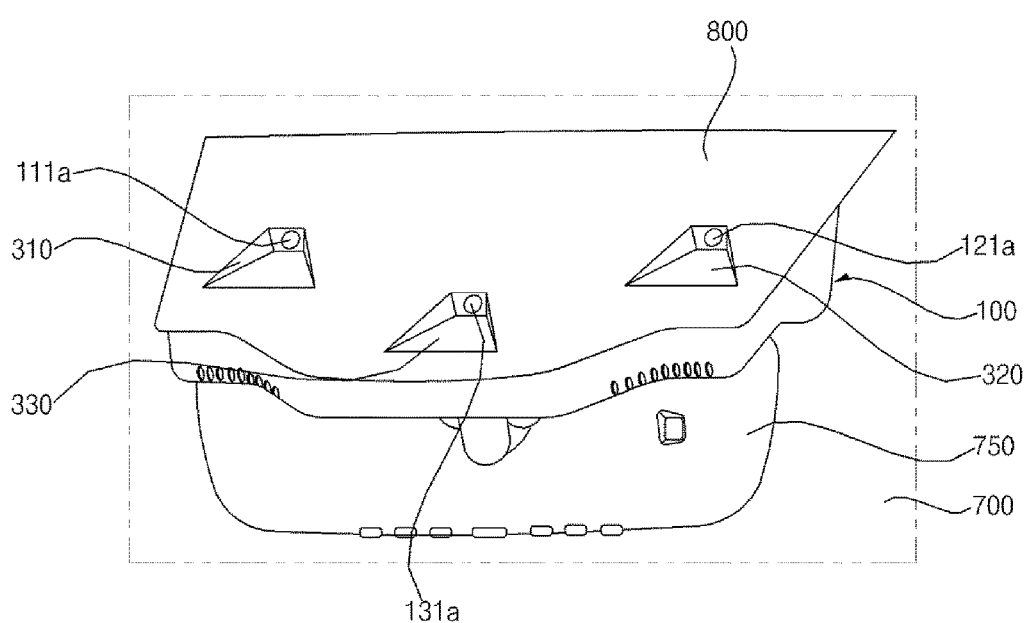
FIG. 3 is a schematic view illustrating the triple camera according to the embodiment of the present invention, which is attached to the windshield.

FIG. 1 is a schematic view illustrating a triple camera according to an embodiment of the present invention. FIG. 2 is a side view illustrating the triple camera according to the embodiment of the present invention. FIG. 3 is a schematic view illustrating the triple camera 100 according to the embodiment of the present invention, which is attached to the windshield 700.

Referring to FIGS. 1-3, a vehicle 10 may be considered as being an internal combustion vehicle equipped with an internal combustion engine, a hybrid vehicle equipped with both an internal combustion engine and an electric motor, and an electric vehicle equipped with an electric motor.

The vehicle 10 includes various sensors. For example, the vehicle 10 may include at least one of an illuminance sensor, an acceleration sensor, a gravity sensor, a gyroscopic sensor, a motion sensor, an ultraviolet sensor, an ultrasonic sensor, an optical sensor, a microphone, a battery gauge, and an environmental sensor (for example, a barometer, a hygrometer, a thermometer, a thermal sensor and a gas sensor). The vehicle 10 disclosed in this specification may combine and utilize information detected by at least two sensors among the above mentioned various sensors.

As one of the various sensors, the vehicle 10 may include a triple camera 100 for obtaining images around the vehicle. Although the triple camera 100 is preferably provided in the interior of the vehicle, an installation position of the triple camera 100 is not limited thereto. The triple camera 100 may be disposed between a windshield 700 and a room mirror 750. The triple camera 100 may be attached to the windshield 700, and may be positioned in the interior of the vehicle such that lenses 111a, 121a and 131a thereof face toward the front of the vehicle.

Referring to FIG. 3, the triple camera 100 may be mounted on the windshield 700 by means of a mount unit 800. For example, the mount unit 800 may be positioned between the windshield 700 and the triple camera 100. The mount unit 800 may be attached to the windshield 700 by means of an adhesive member. The mount unit 800 may include a plurality of grooves or protrusions, and the triple camera 100 may include a plurality of protrusions or grooves corresponding to the plurality of grooves or protrusions provided at the mount unit 800. The triple camera 100 may be mounted on the windshield 700 by fitting the plurality of protrusions or grooves of the triple camera 100 into the plurality of grooves or protrusions of the mount unit 800.

The mount unit 800 may include a plurality of holes. More specifically, the mount unit 800 may include holes formed at positions corresponding to the respective lenses 111a, 121a and 131a facing forward.

The triple camera 100 includes first, second and third light shields 310, 320 and 330. The mount unit 800 may include the holes formed at positions corresponding to the first to third light shields 310, 320 and 330 so as to shield light outside a field of view by the first to third light shields 310, 320 and 330.

Figure 4A:
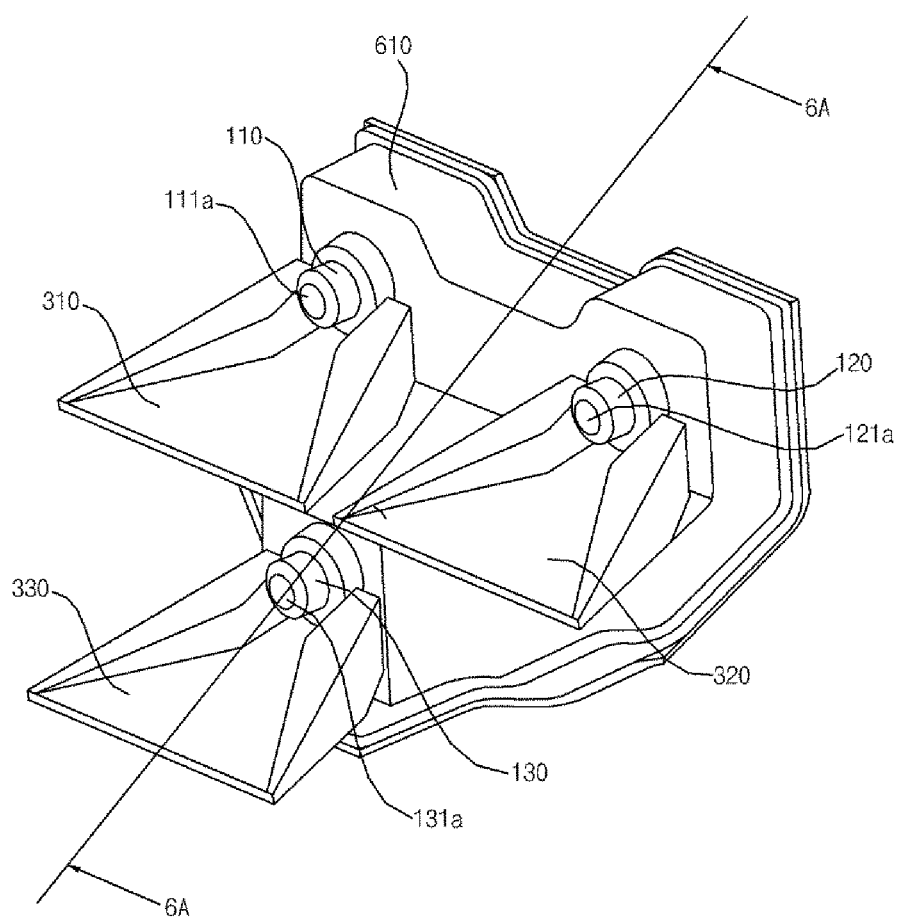
FIG. 4A is a front perspective view of the triple camera according to the embodiment of the present invention.
Figure 4B:
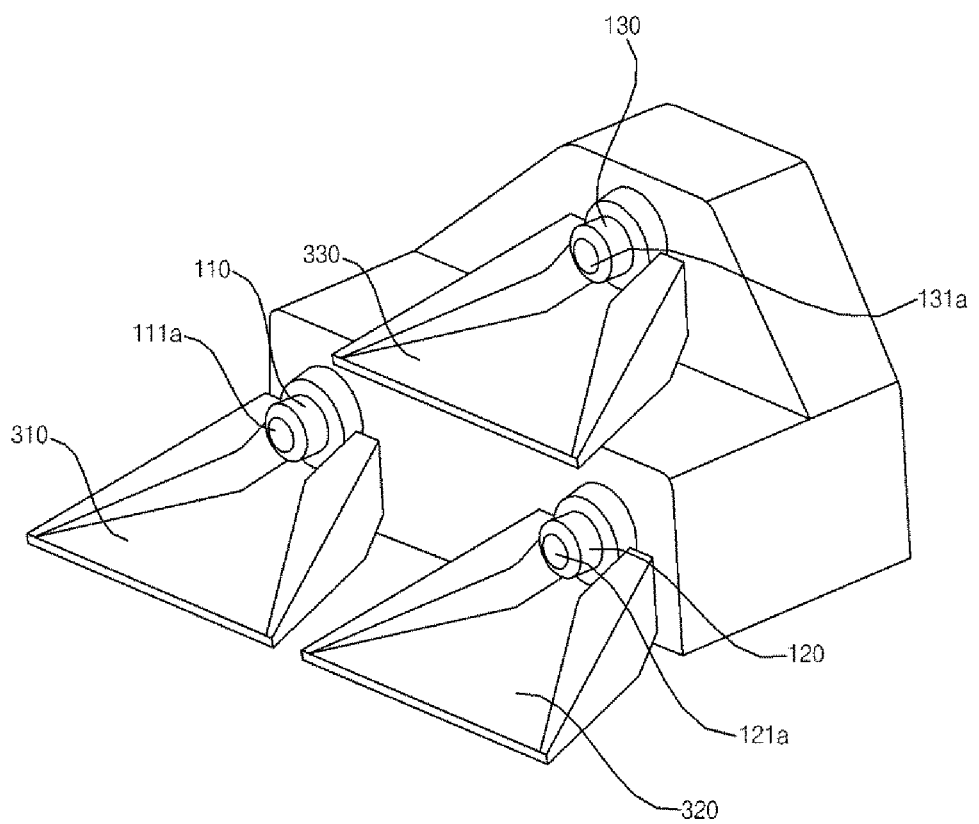
FIG. 4B is a front perspective view of an alternate arrangement of the triple camera of the present invention.
Figure 4C:
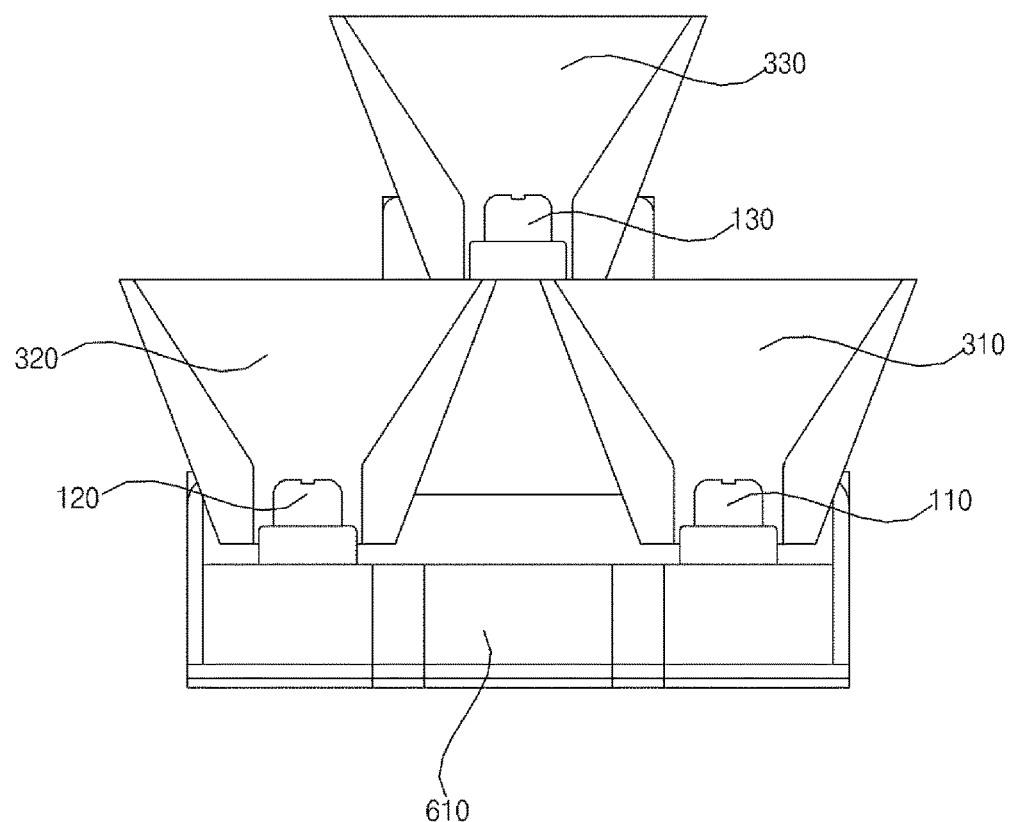
FIG. 4C is a plan view of the triple camera according to the embodiment of the present invention.
Figure 4D:
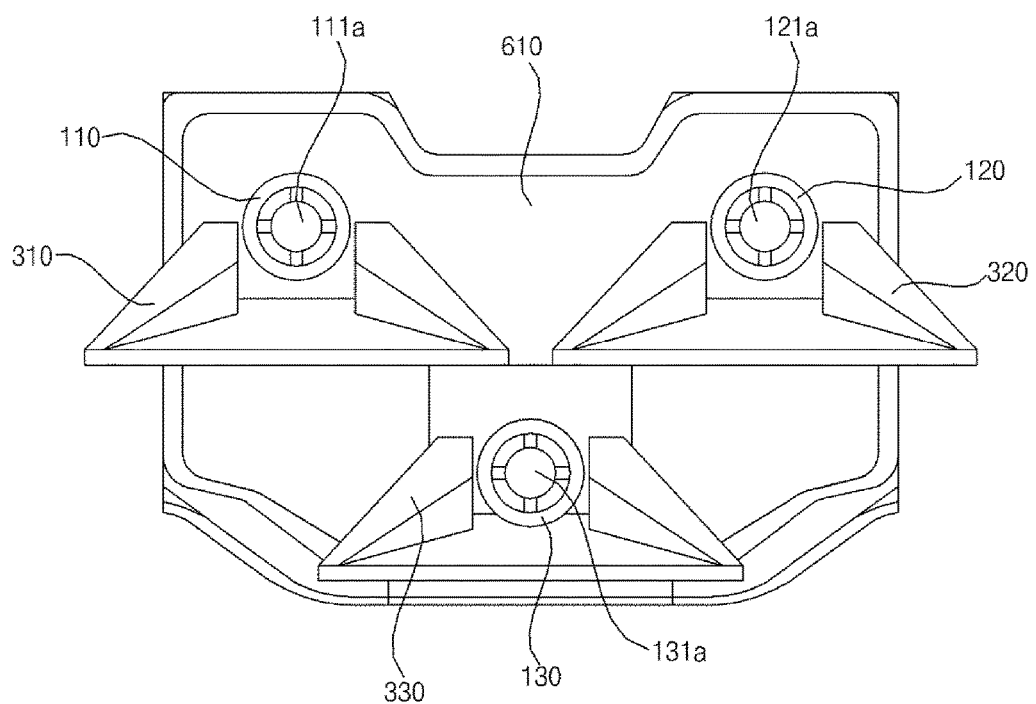
FIG. 4D is a front view of the triple camera according to the embodiment of the present invention.
Figure 4E:
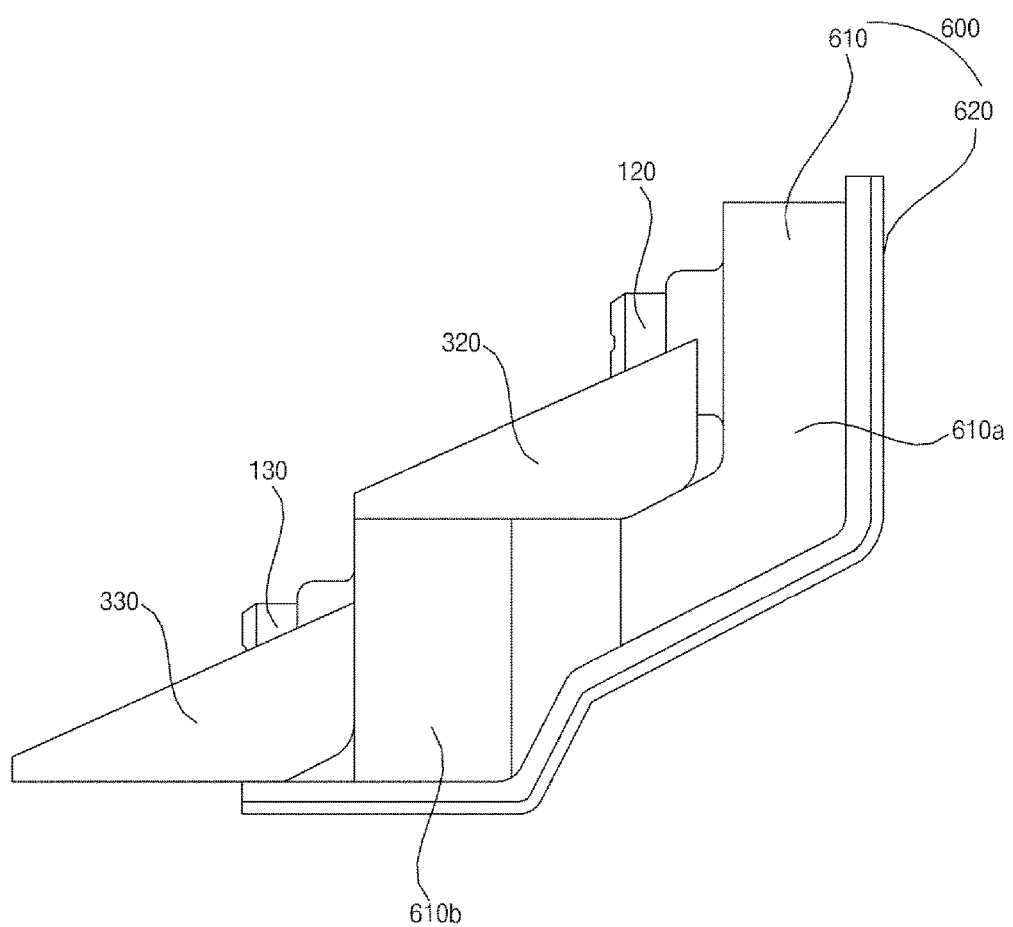
FIG. 4E is a side view of the triple camera according to the embodiment of the present invention.
Figure 4F:
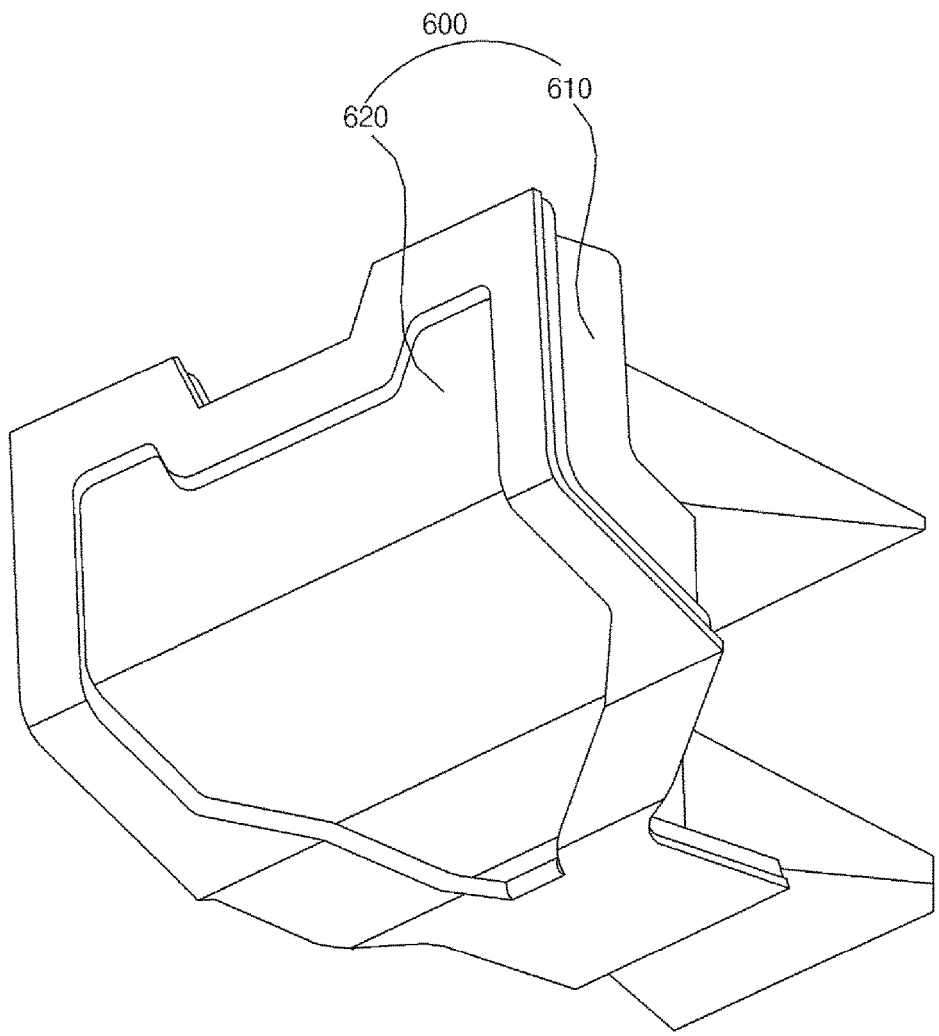
FIG. 4F is a rear view of the triple camera according to the embodiment of the present invention.
Figure 5:
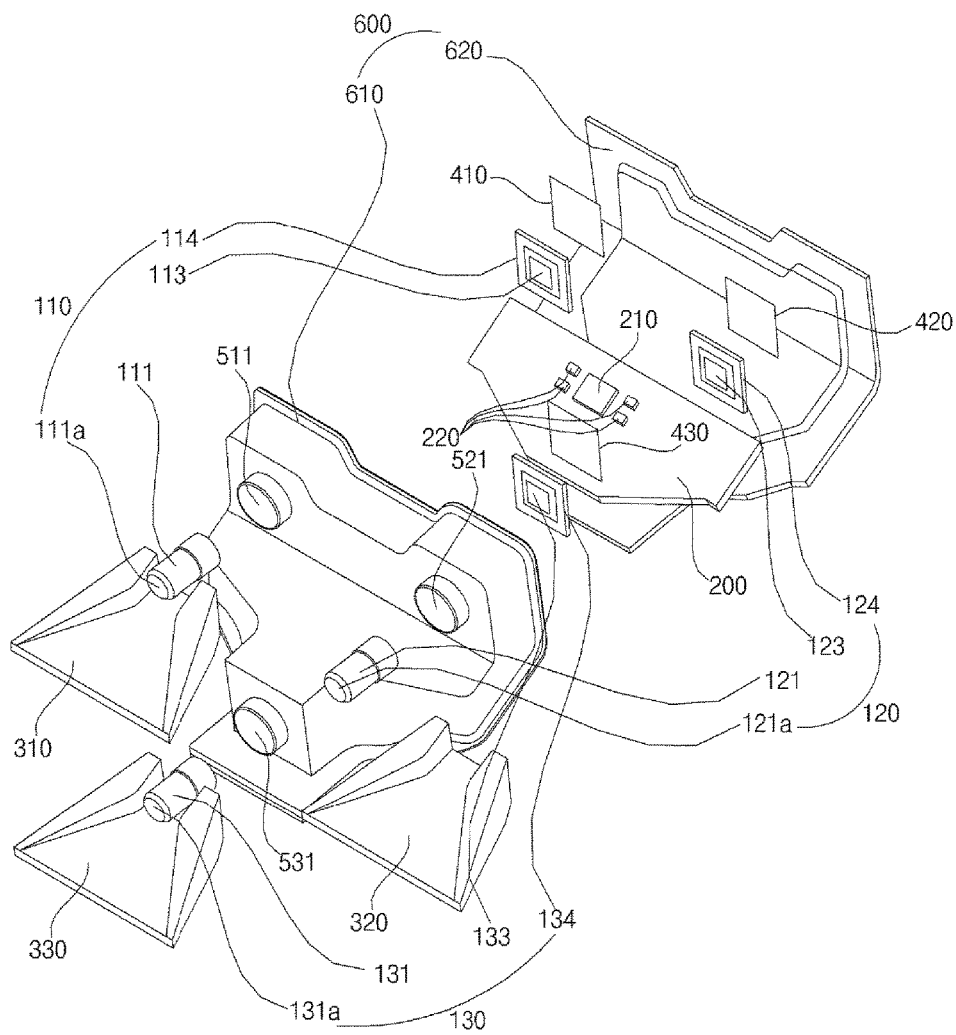
FIG. 5 is an exploded perspective view of the triple camera according to the embodiment of the present invention.
Figure 6A:
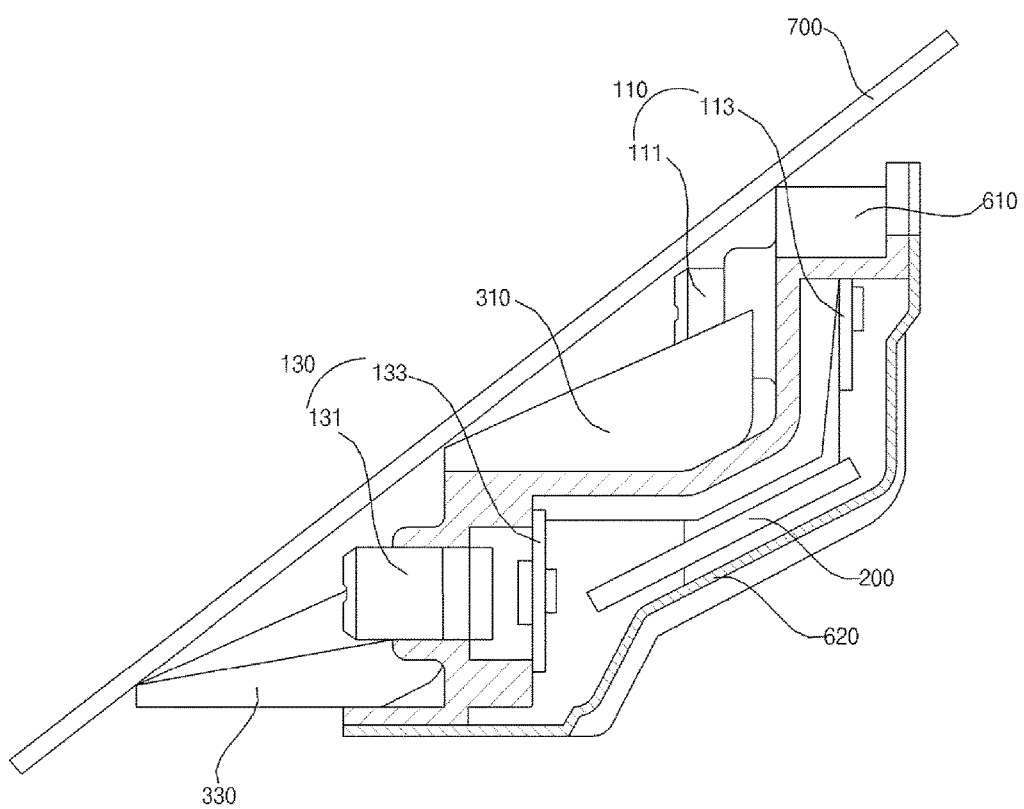
FIG. 6A is a sectional side view of the triple camera according to the embodiment of the present invention, which is taken along line 6A-6A of FIG. 4A.

FIG. 4A is a front perspective view of the triple camera according to the embodiment of the present invention. FIG. 4B is a front perspective view of an alternate arrangement of the triple camera of the present invention. FIG. 4C is a plan view of the triple camera according to the embodiment of the present invention. FIG. 4D is a front view of the triple camera according to the embodiment of the present invention. FIG. 4E is a side view of the triple camera according to the embodiment of the present invention. FIG. 4F is a rear view of the triple camera according to the embodiment of the present invention. FIG. 5 is an exploded perspective view of the triple camera according to the embodiment of the present invention. FIG. 6A is a sectional side view of the triple camera according to the embodiment of the present invention, which is taken along line 6A-6A of FIG. 4A.

Referring to FIGS. 4A to 6A, the triple camera 100 may include a first image capture module 110, a second image capture module 120, a third image capture module 130, a processor board 200, the first light shield 310, the second light shield 320, the third light shield 330, a first radiating member 410, a second radiating member 420, a third radiating member 430, and a housing 600 including a front housing 610 and a rear housing 620.

The first image capture module 110 includes the first lens module 111 and a first image sensor board 113. The first lens module 111 may be fitted in a first hole 511 formed at a front housing 610 by means of a first nut (not shown).

The first lens module 111 may horizontally extend toward the front of the vehicle. The first lens 111a included in the first lens module 111 may be positioned perpendicularly to the plane of FIG. 6A so as to receive incident light from the outside.

The first image sensor board 113 may be a circuit board including a first image sensor 114. Alternatively, the first image sensor board 113 may be integrated with the first image sensor 114. The first image sensor 114 may detect information of an object and convert the information into an image signal. For example, the first image sensor 114 may be embodied as a charge-coupled device (CCD) or a complimentary metal-oxide semiconductor (CMOS).

The first image sensor 114 may be positioned in the interior of the vehicle close to the windshield 700 in order to capture a forward image of the vehicle. In other words, the first image sensor board 113 containing the first image sensor 114 may be connected to the first lens module 111 and may be disposed close to the windshield 700.

The first image sensor board 113 may be disposed behind the first lens module 111 in order to receive an image from the first lens module 111. Preferably, the first image sensor board 113 is spaced apart from the first lens module 111 by a predetermined distance and is positioned perpendicularly to the plane of FIG. 6A.

The first image capture module 110 containing the first image sensor 114 may be disposed close to an interior ceiling of the vehicle 10. For example, the first image capture module 110 may be attached to the interior ceiling of the vehicle 10 with a predetermined connecting member being disposed therebetween. Since the first image capture module 110 is disposed close to the interior ceiling of the vehicle 10, the first image capture module 110 may capture a forward image of the vehicle 10 at the highest position of the vehicle 10, thus assuring a wider forward field of view.

The second image capture module 120 includes the second lens module 121 and a second image sensor board 123.

The second lens module 121 may be fitted in a second hole 521 formed at a front housing 610 by means of a second nut (not shown).

The second lens module 121 may horizontally extend toward the front of the vehicle. The second lens 121a included in the second lens module 121 may be positioned perpendicularly to the plane of FIG. 6A so as to receive incident light from the outside.

The second image sensor board 123 may be a circuit board including a second image sensor 124. Alternatively, the second image sensor board 123 may be integrated with the second image sensor 124. The second image sensor 124 may detect information of a subject and convert the information into an image signal. For example, the second image sensor 124 may be embodied as a charge-coupled device (CCD) or a complimentary metal-oxide semiconductor (CMOS).

The second image sensor 124 may be positioned in the interior of the vehicle close to the windshield 700 in order to capture a forward image of the vehicle. In other words, the second image sensor board 123 containing the second image sensor 124 may be connected to the second lens module 121 and may be disposed close to the windshield 700.

The second image sensor board 123 may be disposed behind the second lens module 121 in order to receive an image from the second lens module 121. Preferably, the second image sensor board 123 is spaced apart from the second lens module 121 by a predetermined distance and is positioned perpendicularly to the plane of FIG. 6A.

The second image capture module 120 containing the second image sensor 124 may be disposed close to an interior ceiling of the vehicle 10. For example, the second image capture module 120 may be attached to the interior ceiling of the vehicle 10 with a predetermined connecting member being disposed therebetween. Since the second image capture module 120 is disposed close to the interior ceiling of the vehicle 10, the second image capture module 120 may capture a forward image of the vehicle 10 at the highest position of the vehicle 10, thus assuring a wider forward field of view.

The first and second image sensors 114 and 124 may be symmetrically disposed on the same plane in the transverse direction. In other words, the second image sensor 124 may be disposed on the plane which extends from the first image sensor 114. The first image sensor board 113 containing the first image sensor 114 and the second image sensor board 123 containing the second image sensor 124 may, of course, also be disposed on the same plane.

The first and second image capture modules 110 and 120 are disposed on the same horizontal plane. Thanks to this configuration, a stereo image may be created on the basis of a first image captured by the first image capture module 110 and a second image captured by the second image capture module 120. More specifically, a horizontal spacing between the first image capture module 110 and the second image capture module 120 causes disparity between the first image capture module 110 and the second image capture module 120, and thus a stereo image which enables detection of distance from a certain object based on the disparity may be created.

In some cases, respective mono images may be created on the basis of the first and second images captured by the first and second image capture modules 110 and 120.

The third image capture module 130 includes the third lens module 131 and a third image sensor board 133. The third lens module 131 may be fitted in a third hole 531 formed at a front housing 610 by means of a third nut (not shown).

The third lens module 131 may horizontally extend toward the front of the vehicle. The third lens 131a included in the third lens module 131 may be positioned perpendicularly to the plane of FIG. 6A so as to receive incident light from the outside.

The third image sensor board 133 may be a circuit board including a third image sensor 134. Alternatively, the third image sensor board 133 may be integrated with the third image sensor 134. The third image sensor 134 may detect information of a subject and convert the information into an image signal. For example, the third image sensor 134 may be embodied as a charge-coupled device (CCD) or a complimentary metal-oxide semiconductor (CMOS).

The third image sensor 134 may be positioned in the interior of the vehicle close to the windshield 700 in order to capture a forward image of the vehicle. In other words, the third image sensor board 133 containing the third image sensor 134 may be connected to the third lens module 131 and may be disposed close to the windshield 700.

The third image sensor board 133 may be disposed behind the third lens module 131 in order to receive an image from the third lens module 131. Preferably, the third image sensor board 133 is spaced apart from the third lens module 131 by a predetermined distance and is positioned perpendicularly to the plane of FIG. 6A.

The third image capture module 130 containing the third image sensor 134 may be disposed close to an interior ceiling of the vehicle 10. For example, the third image capture module 130 may be attached to the interior ceiling of the vehicle 10 with a predetermined connecting member being disposed therebetween. Since the third image capture module 130 is disposed close to the interior ceiling of the vehicle 10, the third image capture module 130 may capture a forward image of the vehicle 10 at the highest position of the vehicle 10, thus assuring a wider forward field of view.

In some cases, a mono image may be created on the basis of the third image captured by the third image capture modules 130.

The third image capture module 130 may be disposed below the first and second image capture modules 110 and 120. For example, the third image capture module 130 may be disposed farther away from the ceiling of the vehicle 10 than the first and second image capture modules 110 and 120. In other words, the third image capture module 130 may be disposed at a lower level than the first and second image capture modules 110 and 120. The first and second image capture modules 110 and 120 may be horizontally spaced apart from each other by a predetermined distance to obtain a stereo image. Consequently, the two image capture modules may occupy a larger space than a space required for disposition of one image capture module. Since the third image capture module 130 is disposed below the first and second image capture modules 110 and 120, there is an advantage in that, as the triple camera 100 becomes close to a driver, a space occupied by the triple camera 100 in the interior of the vehicle 10 is reduced. Furthermore, since the first and second image capture modules 110 and 120 may be positioned at the highest level in the vehicle 10, a field of view sufficient for acquisition of a stereo image is advantageously assured.

The third image capture module 130 may be disposed in front of the first and second image capture modules 110 and 120. For example, the third image capture module 130 may be disposed closer to a front bumper of the vehicle 10 than the first and second image capture module 110 and 120. The windshield 700 provided in the vehicle 10 is generally configured to be inclined from a hood to a roof of the vehicle 10 at a predetermined inclination angle. In this case, since the third image capture module 130 is disposed in front of the first and second image capture modules 110 and 120, the triple camera 100 may have an outer configuration corresponding to the inclination angle of the windshield 700 and thus is easily adaptable to the windshield 700.

In some cases, the third image capture module 130 may be disposed above the first and second image capture modules 110 and 120. In this case, since the third image capture module 130 may be disposed at the highest level in the vehicle 10, a field of view sufficient for acquisition of a mono image is advantageously assured. Alternatively, the third image capture module 130 may be disposed behind the first and second image capture modules 110 and 120. In this case, the triple camera 100 may have an outer configuration corresponding to the inclination angle of the windshield 700 and thus is easily adaptable to the windshield 700.

As illustrated in FIG. 4B, the first and second image capture modules 110 and 120 may be disposed closer to the front bumper of the vehicle 10 than the third image capture module 130.

In some embodiments, the third image capture module 130 may include the third image sensor 134 and the third lens 131a which are suitable for detection of infrared light. Particularly, the third lens 131a may be made of germanium and silicon so as to allow light of infrared wavelengths to be transmitted therethrough while blocking visible light. In this case, the third image capture module 130 may capture a forward infrared image of the vehicle 10.

The third image capture module 130 may be disposed on the virtual centerline between the first and second image capture modules 110 and 120. The virtual centerline may extend in a direction parallel to the windshield 700 through the center point between the first and second image capture modules 110 and 120.

The first to third image sensors 114, 124 and 134 are generally susceptible to heat. Heat generated from the interior of the triple camera 100 causes generation of noise, and the noise may have an adverse influence on signal processing and may cause performance problems with the first to third image sensors 114, 124 and 134.

The first to third image capture modules 110, 120 and 130 may be positioned spaced apart from the windshield 700 by a distance of 10 mm or less. More specifically, the first to third image capture modules 110, 120 and 130 are preferably installed close to the windshield 700. However, since a plurality of image capture modules are installed, the first to third image capture modules 110, 120 and 130 may be spaced apart from the windshield 700 depending on a radius of curvature of the windshield 700. Here, the spacing distance is preferably 10 mm or less in order to reduce effects caused by refraction and the like of light that is incident on the first to third image capture modules 110, 120 and 130 after transmission through the windshield 700.

The processor board 200 is electrically connected to the first to third image sensor boards 113, 123 and 133. The processor board 200 includes a processor 210 for processing images captured by the first to third image sensors 114, 124 and 134. More specifically, the processor 210 may be embodied as a digital signal processor (DSP), an application specific integrated circuit (ASIC) or a microcontroller, and may be attached to one side of the processor board 200.

The processor 210 receives first and second images from the first and second image capture modules 110 and 120, respectively. The processor 210 creates a stereo image on the basis of the first and second images. The processor 210 creates a disparity map on the basis of the created stereo image. Then, the processor 210 may detect at least one object from the disparity map and may track motion of the detected object.

At the same time, the processor 210 receives a third image from the third image capture module 130. The processor 210 creates a forward mono image of the vehicle on the basis of the third image. The processor 210 may subject the mono image to a thermal imaging process to create a thermal picture. Then, the processor 210 may detect at least one object, and may track motion of the detected object. Particularly, when it is difficult to assure a driver's field of view during night driving, the detection of an object through thermal imaging may be effectively used.

In some embodiments, the windshield 700 may include a transparent display. In this case, information obtained from data processed by the processor 210 may be displayed on the transparent display. For example, the object that is detected from the stereo image and is tracked may be displayed on the transparent display. That is, the object that is detected from thermal picture and is tracked may be displayed on the transparent display.

The processor board 200 may be disposed to not be perpendicular to the direction of travel of the vehicle 10. More specifically, since the first to third image sensors 114, 124 and 134 are generally susceptible to heat, the processor board 200 may be disposed differently from the arrangement direction of the first to third image sensor boards 113, 123 and 133 in order to avoid problems caused by heat generated from the processor board 200 as much as possible.

The processor board 200 may be disposed such that a front or back surface thereof faces the windshield 700. For example, the processor board 200 may be disposed to be parallel to the windshield 700. Generally, the windshield 700 provided in the vehicle 10 is inclined from the hood to the roof of the vehicle 10 by an inclination angle. Here, since the processor board 200 is installed such that the front or back surface thereof faces the windshield 700, the stereo camera assembly may be configured to have a smaller size than when the processor board 200 is vertically or horizontally disposed. The reduction in size of the stereo camera assembly may contribute to enlargement of the interior volume of the vehicle.

The processor board 200 may include a plurality of components. The plurality of components included in the processor board 200 may generate a larger amount of heat than the first and second image sensor boards 113 and 123.

The processor board 200 may be spaced apart from the first to third image sensor boards 113, 123 and 133. Since the processor board 200 is spaced apart from the first to third image sensor boards 113, 123 and 133, it is possible to prevent the heat generated from the processor board 200 from influencing performance of the first to third image sensors 114, 124 and 134. In other words, the processor board 200 may be disposed at the optimal position such that the heat generated from the processor board 200 does not influence the first to third image sensors 114, 124 and 134.

For example, the processor board 200 may be disposed below the first and second image sensor boards 113 and 123. For example, the processor board 200 may be disposed behind the third image sensor board 133. For example, the processor board 200 may be disposed between the first and second image sensor boards 113 and 123. For example, the processor board 120 may be disposed at the center of the transversal width of the rear housing 620.

The processor 210, which processes images captured by the first image sensor 114 and the second image sensor 124, may be disposed at the center of the processor board 200. Generally, the processor 210 generates heat due to operation of various calculations. When the processor board 200 is disposed between the first and second image sensor boards 113 and 123, the processor 210 is positioned at the center of the processor board 200, and, as such, the heat generating element may be disposed at the farthest position from the first and second image sensors 114 and 124.

The processor board 200 may include at least one memory 220. The memory 220 stores images captured by the first to third image sensors 114, 124 and 134 or data processed by the processor 210. The images stored in the memory 220 may be deleted at predetermined time intervals. The first to third image capture modules 110, 120 and 130 may serve as black boxes.

Similarly to the processor 210, the memory 220 is one of the principal heat generating elements. After the processor 210 is positioned at the center of the processor board 200, the memory 220 may be disposed around the processor 210. For example, the at least one memory 220 may be arranged close to the processor 210 in a manner surrounding the processor 210. In this case, the processor 210 and the memory 220, which are the heat generating elements, may be disposed at the farthest positions from the first to third image sensors 114, 124 and 134.

The processor 210 may be electrically connected to a vehicle control unit (for example, electronic control unit (ECU)). The processor 210 may exchange data with the vehicle control unit.

The processor board 200 may contact the rear housing 620.

The first light shield 310 may be disposed in front of the first lens 111a included in the first image capture module 110. The first light shield 310 blocks light reflected from the inside the windshield 700 after passing through the windshield 700 and light generated from an unwanted external light source from entering the first lens 111a. The first light shield 310 is configured to have a partition shape to block light outside a field of view. Particularly, considering that the triple camera 100 is attached to the windshield 700, a lower partition is preferably provided so as to reflect light reflected from the inside the windshield 700.

The first light shield 310 may have a shape varying in accordance with the type of vehicle. For example, since a radius of curvature of the windshield 700 or an angle defined between the windshield 700 and the ground surface may differ depending on the type of vehicle, the first light shield 310 preferably has a configuration corresponding to the type of vehicle. To this end, the first light shield 310 preferably has a removable configuration.

The first light shield 310 may be fixed in a state of contact with the windshield 700.

The second light shield 320 may be disposed in front of the second lens 121a included in the second image capture module 120. The second light shield 320 prevents light reflected from the inside the windshield 700 after passing through the windshield 700 and light generated from an unwanted external light source from entering the second lens 121a. The second light shield 320 is configured to have a partition shape to block light outside a field of view. Particularly, considering that the triple camera 100 is attached to the windshield 700, a lower partition is preferably provided so as to reflect light reflected from the inside the windshield 700.

The second light shield 320 may have a shape varying in accordance with the type of vehicle. For example, since a radius of curvature of the windshield 700 or an angle defined between the windshield 700 and the ground surface may differ depending on the type of vehicle, the second light shield 320 preferably has a configuration corresponding to the type of vehicle. To this end, the second light shield 320 preferably has a removable configuration.

The second light shield 320 may be fixed in a state of contact with the windshield 700.

The third light shield 330 may be disposed in front of the third lens 131a included in the third image capture module 130. The third light shield 330 blocks light reflected from the inside the windshield 700 after passing through the windshield 700 and light generated from an unwanted external light source from entering the third lens 131a. The third light shield 330 is configured to have a partition shape to block light outside a field of view. Particularly, considering that the triple camera 100 is attached to the windshield 700, a lower partition is preferably provided so as to reflect light reflected from the inside the windshield 700.

The third light shield 330 may have a shape varying in accordance with the type of vehicle. For example, since a radius of curvature of the windshield 700 or an angle defined between the windshield 700 and the ground surface may differ depending on the type of vehicle, the third light shield 320 preferably has a configuration corresponding to the type of vehicle. To this end, the third light shield 330 preferably has a removable configuration.

The third light shield 330 may be fixed in a state of contact with the windshield 700.

The first radiating member 410 may be disposed behind the first image sensor board 113. The first radiating member 410 contacts the first image sensor board 113 to dissipate heat generated from the first image sensor board 113. As described above, the first image sensor 114 included in the first image sensor board 113 is susceptible to heat. The first radiating member 410 is disposed between the first image sensor board 113 and the rear housing 620 to contact the first image sensor board 113 and the rear housing 620 so as to dissipate heat through the rear housing 620. The first radiating member 410 may be one of a thermal pad and thermal grease.

The second radiating member 420 may be disposed behind the second image sensor board 123. The second radiating member 420 contacts the second image sensor board 123 to dissipate heat generated from the second image sensor board 123. As described above, the second image sensor 124 included in the second image sensor board 123 is susceptible to heat. The second radiating member 420 is disposed between the second image sensor board 123 and the rear housing 620 to contact the second image sensor board 123 and the rear housing 620 so as to dissipate heat through the rear housing 620. The second radiating member 420 may be one of a thermal pad and thermal grease.

The third radiating member 430 may be disposed behind the third image sensor board 133. The third radiating member 430 contacts the third image sensor board 133 to dissipate heat generated from the third image sensor board 133. As described above, the third image sensor 134 included in the second image sensor board 133 is susceptible to heat. The third radiating member 430 is disposed between the third image sensor board 133 and the rear housing 620 to contact the third image sensor board 133 and the rear housing 620 so as to dissipate heat through the rear housing 620. The third radiating member 430 may be one of a thermal pad and thermal grease.

The housing 600 defines an external appearance of the triple camera 100. The housing 600 includes the front housing 610 and the rear housing 620.

The front housing 610 may be configured to surround the first image sensor board 113 including the first image sensor 114, the second image sensor board 123 including the second image sensor 124, and the third image sensor board 133 including the third image sensor 134. The front housing 610 includes the first hole 511, the second hole 521 and the third hole 531. The first lens module 111 may be fitted in the first hole 511 and may be connected to the first image sensor board 113. The second lens module 121 may be fitted in the second hole 521 and may be connected to the second image sensor board 123. The third lens module 131 may be fitted in the third hole 531 and may be connected to the third image sensor board 133.

The front housing 610 may be configured to have a thickness that gradually increases toward the points corresponding to the first to third image sensors 114, 124 and 134. For example, the front housing 610 may be produced through a die casting process. In this case, in order to prevent performance deterioration of the first to third image sensors 114, 124 and 134 caused by heat, the front housing 610 may have a greater thickness at regions close to the points corresponding to the first to third image sensors 114, 124 and 134 than other regions. For example, the front housing 610 may be gradually thickened in the direction of the points corresponding to the first to third image capture modules 110, 120 and 130. In some embodiments, the front housing 610 may be configured such that regions on which the first and second lens modules 111 and 121 are mounted have a greater thickness than the remaining region.

The front housing 610 may have a greater thickness than that of the rear housing 620. In other words, the rear housing 620 may have a smaller thickness than that of the front housing 610. As a thickness of the housing increases, a heat transfer rate is lowered. Accordingly, when the front housing 610 has a greater thickness than that of the rear housing 620, heat generated from the interior of the triple camera 100 may be efficiently dissipated through the rear housing 620 rather than the front housing 610. This is because the front housing 610 is disposed close to the windshield and is thus difficult to dissipate heat.

The front housing 610 may include an attachment unit for enabling the first to third light shields 310, 320 and 330 to be attached thereto. The first to third light shields 310, 320 and 330 may be attached to the front housing 610 through the attachment unit.

The front housing 610 may be stepped. More specifically, the front housing 610 may be stepped vertically so as to be divided into an upper part 610a and a lower part 610b. The upper part 610a of the front housing 610 accommodates the first and second image capture modules 110 and 120. The lower part 610b of the front housing 610 accommodates the third image capture module 130. As described above, owing to the arrangement of the first to third image capture modules 110, 120 and 130, the front housing 610 accommodating the first to third image capture modules 110, 120 and 130 may be stepped vertically.

The rear housing 620 is configured to surround the processor board 200. The rear housing 620 is positioned behind or below the processor board 200. The rear housing 620 may be made of a thermally conductive material. For example, the rear housing 620 may be made of a metal such as aluminum. Since the rear housing 620 is made of thermally conductive material, efficient heat dissipation may be realized.

When the rear housing 620 is made of aluminum, components disposed in the housing (for example, the first to third image sensor boards 113, 123 and 133 or the processor board 200) may be advantageously protected from electromagnetic interference (EMI) and electrostatic discharge (ESC).

The rear housing 620 may contact the processor board 200. Therefore, heat may be efficiently transferred and dissipated to the outside through the contact portion. In some embodiments, the contact portion at which the rear housing 620 contacts the processor board 200 may be made of a thermally conductive material.

Figure 6B:
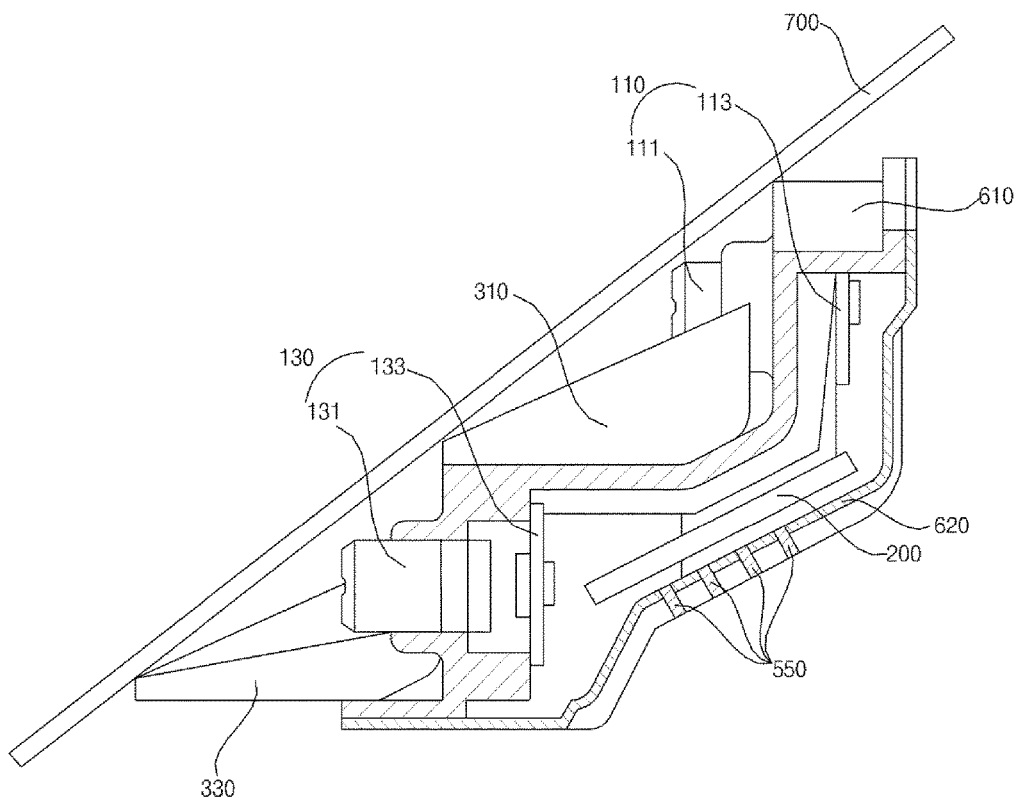
FIG. 6B is a sectional side view of the triple camera including the radiating unit according to the embodiment of the present invention.

FIG. 6B is a sectional side view of the triple camera including the radiating unit according to the embodiment of the present invention.

As illustrated in FIG. 6B, the rear housing 620 may further include the radiating unit 550. For example, the radiating unit 550 may include at least one of a heat sink, radiating fins, a thermal pad and thermal grease. In some embodiments, the radiating unit 550 may be made of a thermally conductive material. The radiating unit 550 dissipates heat generated from the interior of the triple camera 100 to the outside. The radiating unit 550 may be positioned between the processor board 200 and the rear housing 620 so as to contact the processor board 200 and the rear housing 620, thus allowing heat generated from the processor board 200 to be dissipated to the outside. For example, the radiating unit 550 may be cooling fins. In this case, first ends of the cooling fins may contact the processor board 200 and opposite ends of the cooling fins may be exposed to the outside.

The front housing 610 and the rear housing 620 may be joined to each other by means of fastening elements. The front housing 610 may be mounted on the windshield 700 by means of the mount unit 800.

Figure 7:
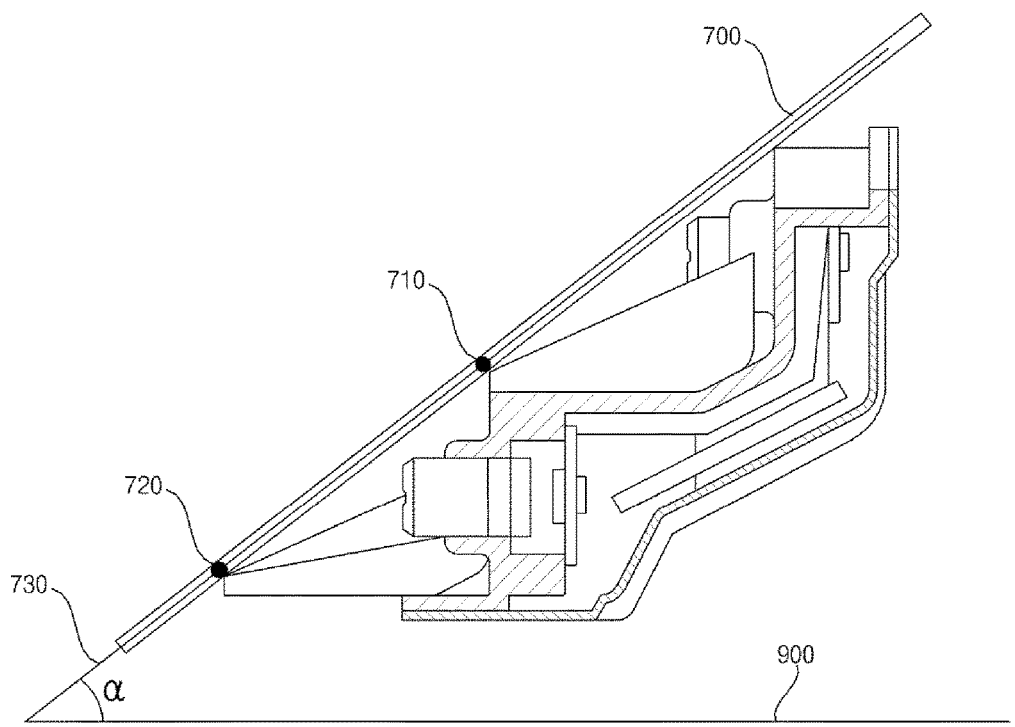
FIG. 7 is a sectional side view of a triple camera according to another embodiment of the present invention.

FIG. 7 is a sectional side view of a triple camera according to another embodiment of the present invention.

Referring to FIG. 7, an inclination angle (a) defined between a virtual line 730 extending through both a virtual center point 710 and a third contact point 720 and the ground surface 900 may coincide with an inclination angle of the windshield 700. For example, the inclination angle (a) defined between the virtual line extending through both the virtual center point 710 and the third contact point 720 and the ground surface 900 may be within a range of 30° to 90. The virtual center point 710 may be positioned at the center between a first contact point (not shown) at which the first light shield 310 contacts the windshield 700 and a second contact point (not shown) at which the second light shield 320 contacts the windshield 700. The third contact point 720 may be a contact point at which the third light shield 330 contacts the windshield 700.

By making the inclination angle (a) defined between the virtual line extending through both the virtual center point 710 and the third contact point 720 and the ground surface 900 the same as the inclination angle of the windshield 700, the triple camera may be advantageously mounted on the windshield 700 in accordance with the inclination angle of the windshield 700.

Figure 8A:
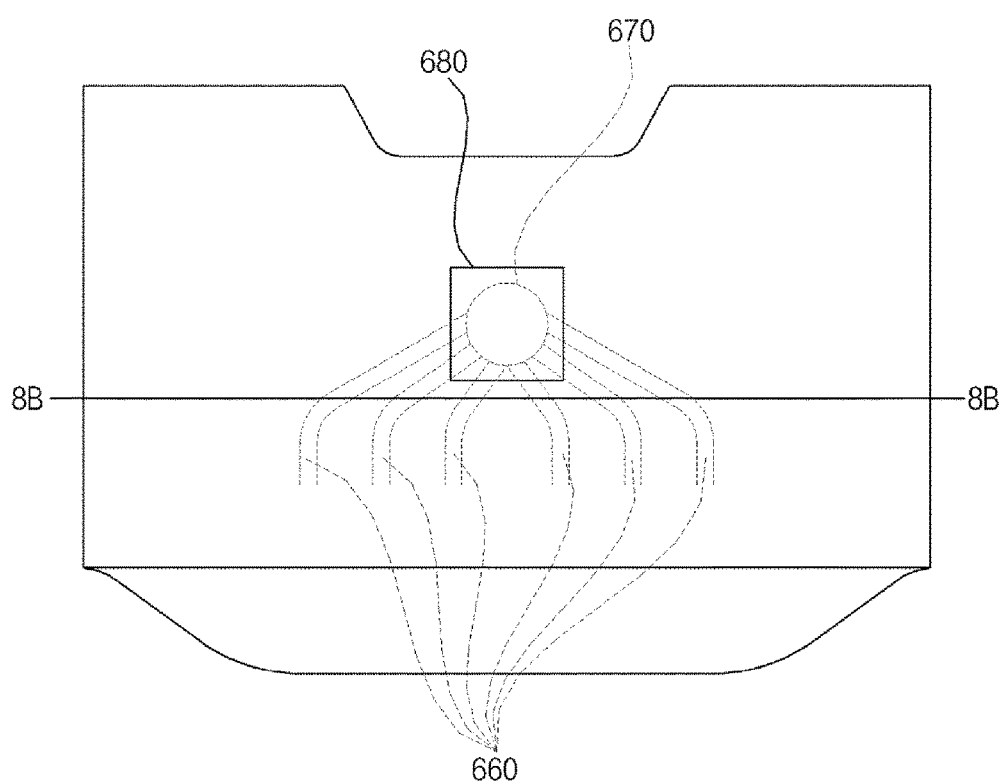
FIG. 8A is a rear view of the triple camera according to the embodiment of the present invention.
Figure 8B:
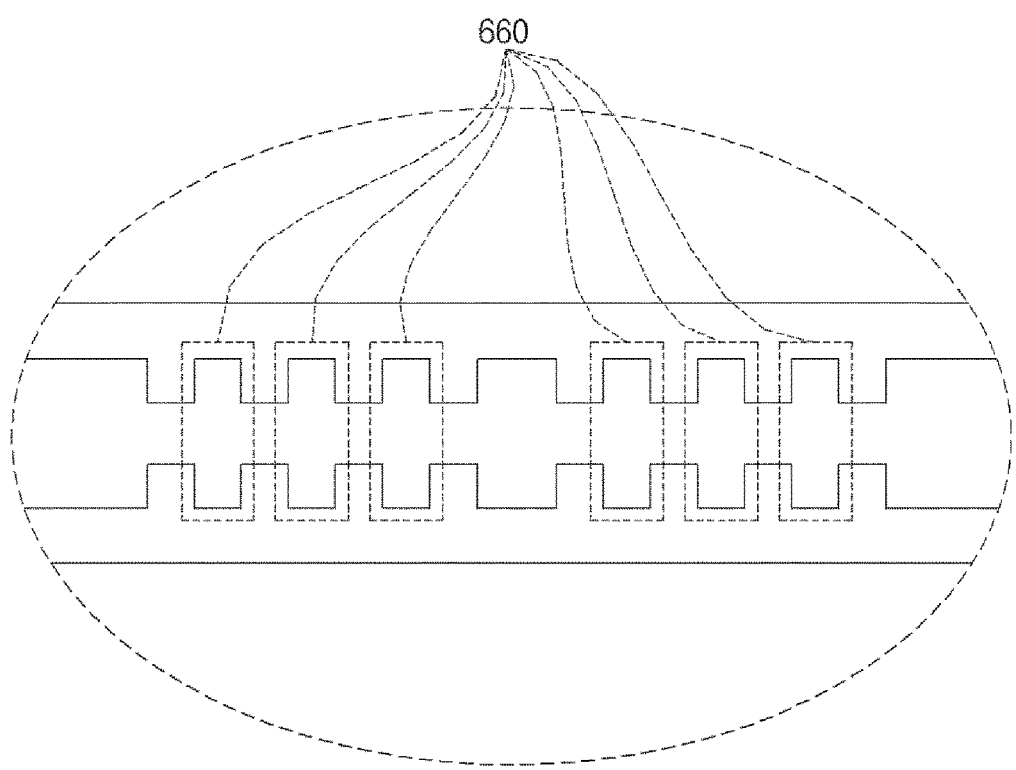
FIG. 8B is a sectional plan view taken along line 8B-8B of FIG. 8A.
Figure 8C:
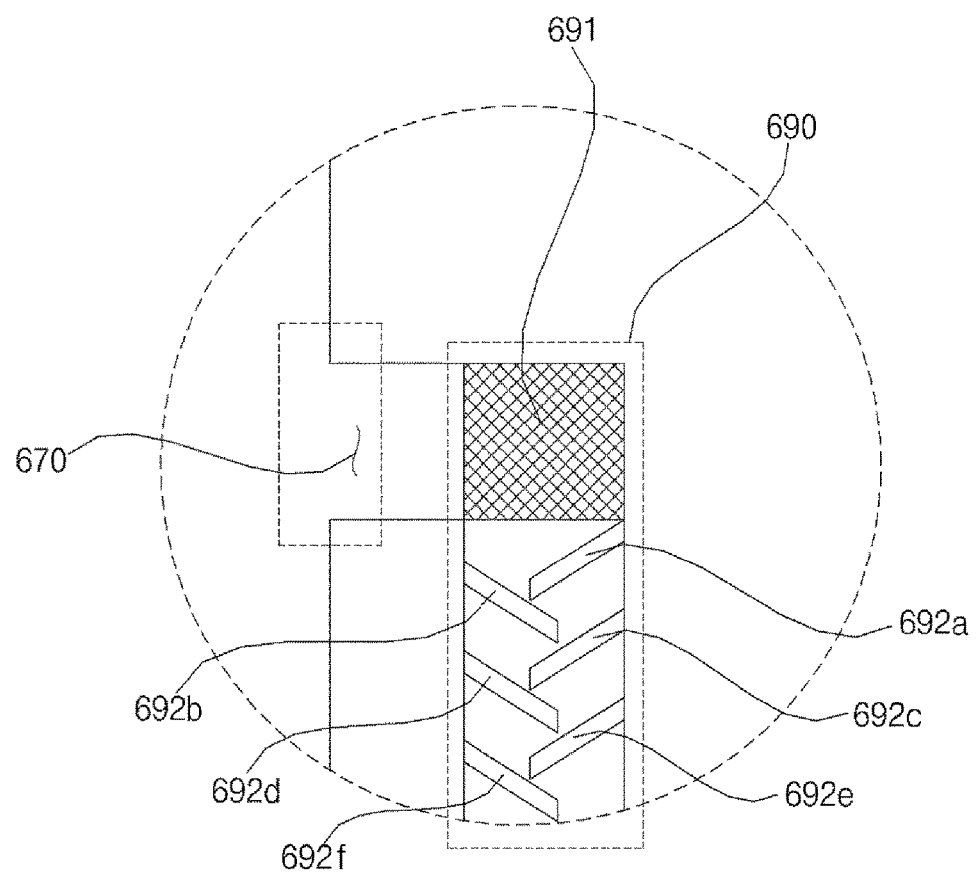
FIG. 8C is a side view, which is partially broken away, illustrating the moistureproof unit of the triple camera according to another embodiment of the present invention.

FIGS. 8A to 8C are views of an air flow unit, an air discharge hole and a moistureproof unit according to the embodiment of the present invention.

FIG. 8A is a rear view of the triple camera 100 according to the embodiment of the present invention. FIG. 8B is a sectional plan view taken along line 8B-8B of FIG. 8A. FIG. 8C is a side view illustrating the moistureproof unit, which is partially broken away.

The triple camera 100 may include the air flow unit 660 provided in the housing 600. The air flow unit 660 may be a flow channel for discharging heat generated from the interior of the triple camera 100 to the outside. For example, when heat is generated from the processor board 200, air in the triple camera 100 may increase in temperature due to the generated heat. Since the high temperature air tends to rise, the high temperature air may be discharged to the outside of the triple camera 100 through the air flow unit 660. The air flow unit 660 may guide internal air of the triple camera 100.

The triple camera 100 may include the air discharge hole 670. The air discharge hole 670 is formed at one end of the air flow unit 660 to discharge the high temperature air to the outside. The air discharge hole 670 may be formed at a portion of the front housing 610 or the rear housing 620. Since hot air tends to rise, the air discharge hole 670 is preferably provided at the upper end of the rear housing 620.

The triple camera 100 may further include the moistureproof unit 680. As illustrated in FIG. 8A, the moistureproof unit 680 may be a moistureproof member which is constructed into a patch shape and is attached to the air discharge hole 670. The moistureproof member may be made of Gore-Tex.

As illustrated in FIG. 8C, in another embodiment, the moistureproof unit 690 may include a plurality of protrusions 692a-692f and a moisture absorption member 691. The plurality of protrusions 692a-692f may be configured in such a manner as to discharge internal air of the triple camera 100 while blocking introduction of external moisture into the triple camera 100. For example, the plurality of protrusions 692a-692f may be provided in the air discharge hole 670 in such a manner that the protrusions 692a-692f are arranged alternately and extend in the state of being inclined downward. More specifically, a first protrusion 692a may extend from one internal side surface of the air flow unit 660 while being inclined downward by a predetermined angle. A second protrusion 692b may be provided at the opposite internal side surface under the first protrusion 692a, and may extend in a direction intersecting with the direction of the first protrusion 692a while being inclined downward by a predetermined angle. A third protrusion 692c may be provided at the one internal side surface under the second protrusion 692b, and may extend in a direction intersecting with the direction of the second protrusion 692b while being inclined downward by a predetermined angle. A fourth protrusion 692d may be provided at the opposite internal side surface under the third protrusion 692c, and may extend in a direction intersecting with the direction of the third protrusion 692c while being inclined downward by a predetermined angle. A fifth protrusion 692e may be provided at the one internal side surface under the fourth protrusion 692d, and may extend in a direction intersecting with the direction of the fourth protrusion 692d while being inclined downward by a predetermined angle. A sixth protrusion 692f may be provided at the opposite internal side surface under the fifth protrusion 692e, and may extend in a direction intersecting with the direction of the fifth protrusion 692e while being inclined downward by a predetermined angle.

The moisture absorption member 691 may absorb external moisture that is introduced into the triple camera 100 through the air discharge hole 670. The moisture absorption member 691 may include a sponge and the like.

As specifically described above, the triple camera according to at least one embodiment of the present invention may provide the following effects.

1) The triple camera according to the present invention concurrently provides a stereo image and a mono image to a vehicle so as to allow the images to be processed and utilized as necessary.

2) Since the processor board is positioned such that a front or back surface thereof faces a windshield, various components may be efficiently disposed in the triple camera.

3) Since the housing is configured to allow efficient heat dissipation, heat generated from the outside or inside of the triple camera may be efficiently managed.

4) Since three image capture modules are efficiently disposed in the triple camera, the triple camera may occupy a smaller space when installed in a vehicle.

Effects of the present invention are not limited to the above disclosed effects, and other effects of the present invention which are not disclosed herein will be clearly understood from the accompanying claims by those skilled in the art.

It will be understood by those skilled in the art that the present invention is not limited to the embodiments but may be variously changed without departing from the technical idea of the present invention. Therefore, it should be understood that the embodiments disclosed in the present invention are not restrictive but are illustrative. The scope of the present invention should be interpreted by the accompanying claims rather than the above detailed description, and it is to be understood that all technical ideas within the claims fall within the purview of the present invention.

What is claimed is:

1. A triple camera for capturing forward images of a vehicle, comprising:
   a housing defining an external appearance of the triple camera;
   a first image capture module including a first lens module and a first image sensor configured to capture a first forward image of a vehicle;
   a second image capture module including a second lens module and a second image sensor configured to capture a second forward image of a vehicle;
   a third image capture module including a third lens module and a third image sensor configured to capture a third forward image of a vehicle; and
   a processor board including a processor configured to process the first forward image, the second forward image, and the third forward image; and
   a plurality of heat generating elements disposed at the processor board,
   wherein:
   the first image capture module, the second image capture module, and the third image capture module are disposed in the housing,
   the housing comprises a front housing that is stepped vertically so as to be divided into an upper part and a lower part that is located at a front lower side of the upper part, and a rear housing that is disposed on a rear side of the front housing based on a direction of travel of a vehicle,
   at least one of the image capture modules is placed at the upper part of the front housing, and at least another of the image capture modules is placed at the lower part of the front housing,
   the processor board is disposed behind the at least the another of the image capture modules placed at the lower part of the front housing and below the at least one of the image capture modules, the front housing has a thickness that gradually increases toward points corresponding to the first to third image sensors, the rear housing has a smaller thickness than the thickness of the front housing, the processor is disposed at a center of the processor board, and the plurality of heat generating elements is arranged close to the processor in a manner surrounding the processor.

2. The triple camera according to claim 1, wherein the first image capture module and the second image capture module are disposed on a same horizontal line, and the third image capture module is disposed below the first image capture module and the second image capture module.

3. The triple camera according to claim 1, wherein the processor is configured to provide a forward stereo image of a vehicle on the basis of the first forward image and the second forward image to the vehicle so as to detect an object in front of a vehicle from the forward stereo image of the vehicle, and wherein the processor is configured to provide a forward mono image of a vehicle on the basis of the third forward image to the vehicle so as to detect an object in front of a vehicle from the forward mono image of the vehicle.

4. The triple camera according to claim 3, wherein the processor board contacts the housing, and wherein a portion of the housing contacting the processor board is made of a thermally conductive material.

5. The triple camera according to claim 3, wherein the first lens module, the second lens module, and the third lens module are mounted on the front housing, and wherein the front housing has a greater thickness at a part on which the first lens module and the second lens module are mounted than a remaining part of the front housing on which the first lens module and the second lens module are not mounted.

6. The triple camera according to claim 1, wherein the processor board is disposed behind the third image capture module in the housing so as to not be perpendicular to a direction of travel of a vehicle.

7. The triple camera according to claim 6, wherein the processor board is disposed behind the third image capture module and below the first image capture module and the second image capture module, and is inclined downward in a forward direction.

8. The triple camera according to claim 1, wherein the processor is configured to subject the third forward image to a thermal imaging process to produce a processed image, and wherein the processor is configured to detect an object in front of a vehicle from the processed image.

9. The triple camera according to claim 1, further comprising:

a first light shield configured to contact a windshield and to block introduction of light outside a field of view into the first image capture module;

a second light shield configured to contact a windshield and to block introduction of light outside a field of view into the second image capture module; and a third light shield configured to contact a windshield and to block introduction of light outside a field of view into the third image capture module.

10. The triple camera according to claim 1, wherein the first image capture module, the second image capture module, and the third image capture module are mounted on the front housing.

11. The triple camera according to claim 10, further comprising a radiating unit disposed between the processor board and the rear housing to dissipate heat generated from the processor board.

12. The triple camera according to claim 1, wherein the third image capture module is disposed closer to a front bumper of a vehicle than the first image capture module and the second image capture module.

13. The triple camera according to claim 12, wherein the third image capture module is disposed on a virtual centerline between the first image capture module and the second image capture module.

14. The triple camera according to claim 12, wherein an angle defined between a virtual line extending through a center of a virtual centerline connected between front ends of the first lens module and the second lens module and a front end of the third lens module and a ground surface is within a range of 30° to 90°.

15. The triple camera according to claim 12, wherein the first image capture module, the second image capture module, and the third image capture module are spaced apart from a windshield of a vehicle by a spacing distance of 10 mm or less.

16. The triple camera according to claim 1, wherein the first image capture module and the second image capture module are disposed closer to a front bumper of a vehicle than the third image capture module.

17. The triple camera according to claim 16, wherein the third image capture module is disposed on a virtual centerline between the first image capture module and the second image capture module, and wherein an angle defined between a virtual line extending through a center of a virtual centerline connected between front ends of the first lens module and the second lens module and a front end of the third lens module and a ground surface is within a range of 30° to 90°.

18. The triple camera according to claim 16, wherein the first image capture module, the second image capture module, and the third image capture module are spaced apart from a windshield of a vehicle by a spacing distance of 10 mm or less.

* * * * *